Joseph C. Neitzel
INVENTOR.

BY Bertram H. Mann
ATTORNEY

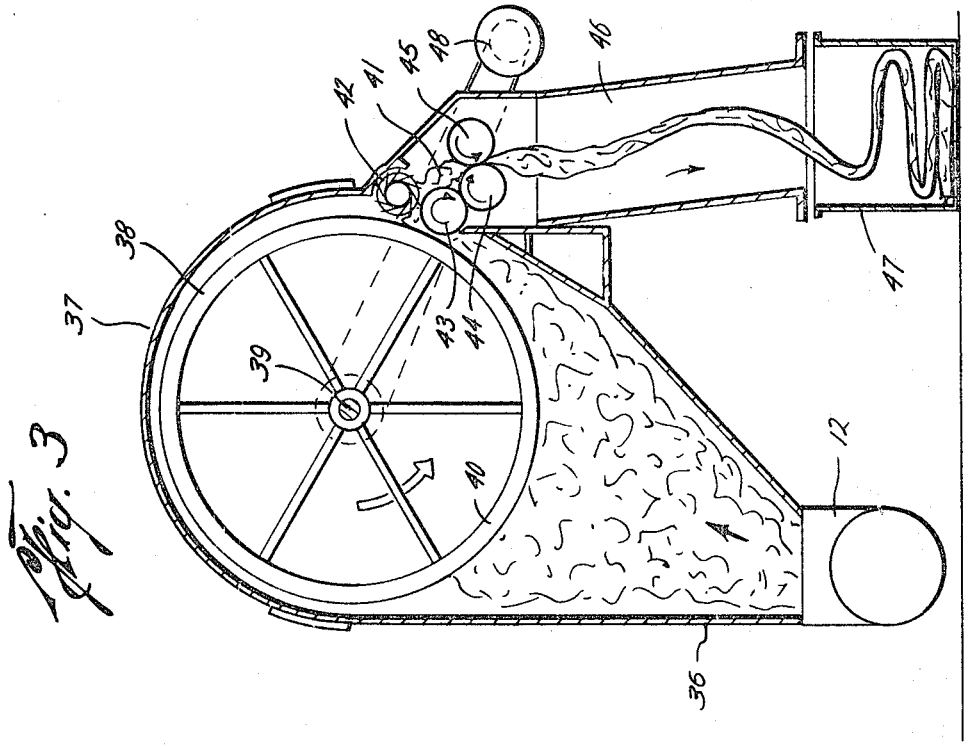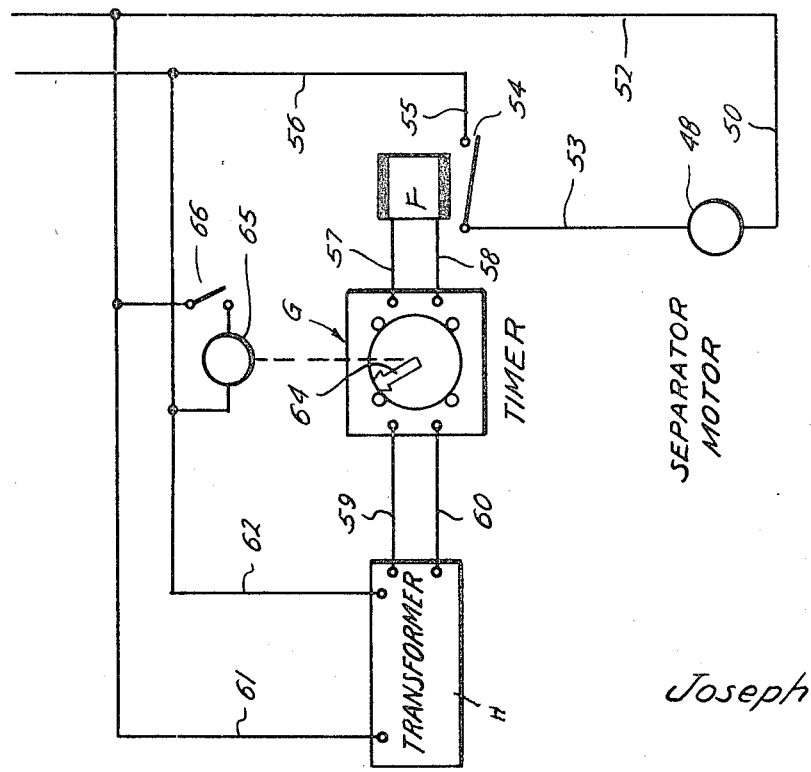

United States Patent Office 3,525,198
Patented Aug. 25, 1970

---

3,525,198
FLY LINT RECOVERY APPARATUS
Joseph C. Neitzel, Denton, Tex., assignor to Murray Company of Texas, Inc., Dallas, Tex., a corporation of Texas
Filed May 31, 1968, Ser. No. 733,519
Int. Cl. B01d 46/26
U.S. Cl. 55—272                           1 Claim

ABSTRACT OF THE DISCLOSURE

A primary fly lint separator and recovery apparatus is inserted in the pneumatic duct wihch customarily connects the carding room in a textile mill with lint filtering means. The primary recovery apparatus comprises a rotary drum positioned to collect lint on the upstream face thereof and to pass carrier air and fine trash through the interior of the drum. Due to the sparse density of the lint and the carrier air, the drum is caused to remain stationary for substantial periods of time so as to collect lint of sufficient thickness to be efficiently doffed during successive rotation of the drum.

BACKGROUND OF THE INVENTION

This invention relates to apparatus for separating and recovering fibers, particularly fly lint, from carrier air.

The atmosphere in and around carding machines in textile mills usually carries varying quantities of fly lint. To remove and recover this lint, the atmosphere in the carding room and about the machines is pneumatically carried to one or more filter rooms from which the collected lint must be removed frequently, as often as every three hours. Since the carrier air is drawn through the ducting and filter means by means of suction pumps, necessarily there are periods prior to the filling of the filter room or rooms when the velocity of the carrier air is reduced due to the clogging effect of the trapped lint.

Continuously acting lint separators have been tried for the purpose of separating and recovering fly lint from the atmosphere of carding rooms. However, the most feasible type of continuous separator—namely, a separator using a rotating screen drum—has not proven practical since, due to the very low density of lint in the carrier air, insufficient lap can be built upon the drum surface for efficient doffing, no matter how slow the drum rotates. Consequently, rotating drum types of filters have not been successfully utilized for this purpose.

SUMMARY OF THE INVENTION

An object is to provide a novel rotary-type lint separator and motor controls therefor which cause the building up of a sufficient thickness of lint on the surface of the drum to promote efficient doffing of the lint therefrom.

These objects and others are attained by providing a rotary drum type of separator in a pneumatic duct, used, for instance, to connect a carding room and the usual filter room for collecting the lint. Motor and control means for the rotary drum cause rotation thereof intermittently so that the drum will remain stationary for sufficient time periods to cause a build-up of lint on the exposed upstream face of the drum which can be efficiently doffed during the intermittent rotations of the drum. A timed control is provided so that the stationary periods can be adjusted in accordance with the density of the fly lint. I have found that these stationary periods may extend from several times the duration of the periods of rotation to as much as five minutes. In a preferred form, the intermittent rotations of the drum extend through 180 degrees thereof.

BRIEF DESCRIPTION OF THE DRAWINGS

In the accompanying drawings which illustrate the invention,

FIG. 3 is an enlarged section taken substantially on line 3—3 of FIG. 1.

FIG. 4 is a wiring diagram showing elements of the rotary drum control means.

DESCRIPTION OF THE PREFERRED EMBODIMENT

Figure 1:
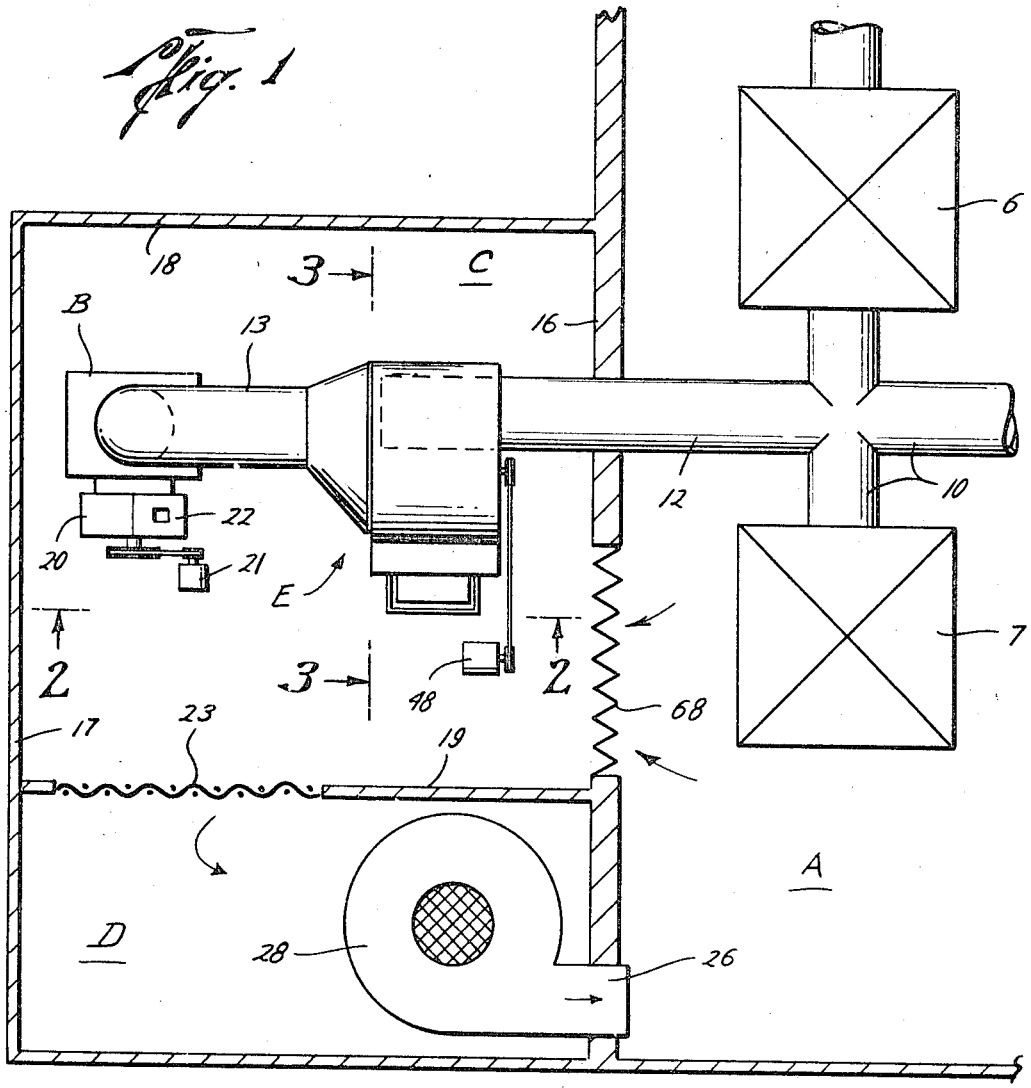
FIG. 1 is a schematic plan view showing the arrangement of a carding room and primary and secondary filtering means, according to the present invention, for separating and collecting fly lint from the atmosphere in the carding room and about the carding machines.
Figure 2:
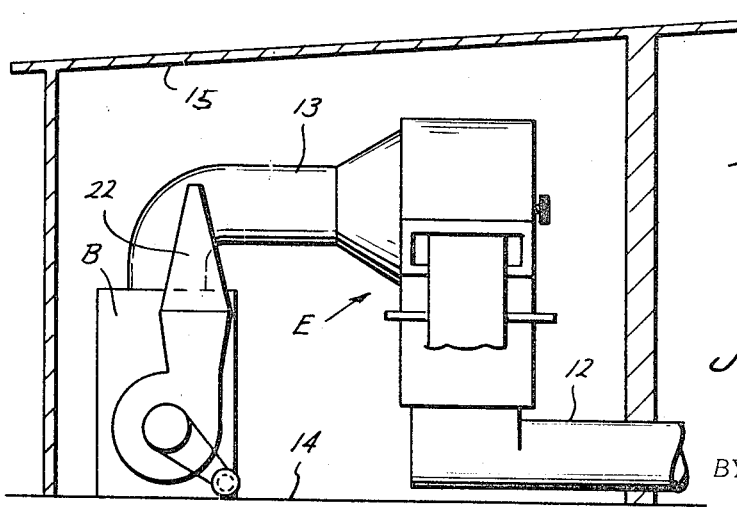
FIG. 2 is a side view of part of the structure in FIG. 1.

FIGS. 1 and 2 show a carding room A in which are mounted one or more batteries of carding machines, as as 6, 7, etc. Each group of carding machines is connected by manifolding, as at 10, and ducting 12 and 13 with a main or secondary filtering system generally designated B located in a filter room C having floor 14, ceiling 15, end walls 16 and 17, and side walls 18 and 19. Mounted at the side of filtering system B is a suction fan 20 driven by a motor 21. The inlet of fan 20 is connected to the interior of filtering system B, while the outlet thereof discharges through a diffuser 22 into filter room C. Adjacent side wall 19 there is provided a wash or humidifying chamber D (details not shown) connected through a screen 23 in wall 19 to filter room C. A duct 26 leading from a blower 28 having suitable drive means (not shown) returns the humidified air to card room A. Filter system B is provided with suitable doors through which the collected fly lint from the carding room may be removed periodically. As pointed out above, such removal must be done fairly frequently with conventional systems, sometimes as often as every three hours. This is a labor and time consuming operation.

In order to substantially extend the periods of time between the clean-outs of filter system B and, also, to improve the quality of the recovered fly lint, a primary filtering separator E, shown in detail in FIG. 3, is inserted between duct parts 12 and 13. Duct 12 leading from cards 6, 7, etc., is connected to the bottom of an upwardly extending, flared conduit 36 leading to a partial cylindrical housing 37 in which a screen drum 38 is rotatably mounted on a shaft 39. The entire cylindrical wall of drum 38 is formed of a screen or foraminous sheet of suitable fineness for catching the fly lint particles to which its upstream face 40 is exposed. Adjacent a portion of the drum somewhat spaced from upstream face 40 are a series of doffing rollers 42, 43, 44 and 45. Roller 42 has outwardly projecting rubber flights and turns oppositely to roller 43 and the drum for collecting the lap of lint on the surface of the counterclockwise rotating drum, as indicated at 41, and feeding it between rollers 44 and 45 to a downward branch duct fiber slide 46 leading to a lint recovery and collection area, such as a box 47. Drum 38 is driven by a motor 48. The drum extends crosswise of conduit 36 and its ends run sufficiently closely in the ends of casing 37 to divert the carrier air and fine trash through the screen and into the interior of the cylinder and thence through duct part 13 into filter B.

FIG. 4 shows a form of electrical control for separator drum driving motor 48. The motor is connected by a lead 50 to a power line 52 and by a lead 53 to normally open contacts 54 of a relay F, which contacts are also connected by a wire 55 to power line 56. Closing of relay contacts 54 will complete an energizing circuit through motor 48. The coil of relay F is connected by wires 57 and 58 to output terminals of a timing switch G. The input terminals of the timing switch are connected by wires 59 and 60 to the secondary terminals of a transformer H. The primary terminals of the transformer are connected by leads 61 and 62 to power lines 52 and 56. Timer switch G is actuated by a motor 65 and is equipped with timing mechanism and an adjusting means, as hand 64, by means of which the timed actuation of switch G is variable. Timer motor 65 is connected to the power lines through a main control switch 66. Timer G is of the type which, upon energization of its drive motor 65, sequentially opens and closes its output contacts at time intervals controlled by hand 64.

End wall 16 separating filter room C and card room A has an apertured portion equipped with a filter 68 through which the atmosphere of the card room is constantly drawn for recirculation through humidifying chamber D.

In operation, with primary separator E and main or secondary filter B connected in ducting 12 and 13 leading from the card battery 6, 7, etc., timer control G of separator drum motor 48 is adjusted as by means of hand 64 to adjust the intermittent dwell or stationary portions of the rotation of the drum cylinder 38 until this portion of the drum cycle is of long enough duration to cause such build-up of lint on the surface of the drum that doffing rollers 42 and 43 will efficiently catch the lap, as shown at 45 in FIG. 3, and divert it through forming rollers 44 and 45. The appropriate timing of the dwell depends, of course, upon the density and velocity of lint in the pneumatic carrier air in duct 12. A suitable speed control (not shown) may be provided to adjust the rotational velocity of the drum. Starting of drum 38 is achieved, of course, by closing of relay contacts 54 controlled by timer G. As previously indicated, the timing of the intermittent movements of the cylinder, preferably, is such that the cylinder moves at 180 degrees in the interim between dwell periods. When the cyclical intermittent motion of the drum is properly adjusted, as explained, separator E operates continuously and lint intermittently collects on the upstream 180° face of the drum and is then wiped therefrom by doffing rollers 42 and 43. The recovered lint delivered through slide pipe 46 into box 47 may be continuously removed, as by a belt, or recovered from time to time by removal of the box 47. In either case, the lint will be later subjected to baling or other packaging procedures. A small amount of lint may escape into filter system B, and from time to time this filter system also will be cleaned out. However, due to the efficient action of rotary separator E, the intervals between clean-out of filter system B will be very much longer than heretofore. The majority of the fly lint is removed by the novel rotary, primary filtering means and the quality of the recovered lint is substantially improved so as to command a higher price. In some cases, the lint so recovered can be reintroduced into the card to produce usable thread.

In fact, under some conditions, a filter system as at B may be completely eliminated in favor of the novel rotary, continuously acting filter system. In some cases, the card room is equipped with a plurality of batteries of carding engines each having its separate filter system, including the parts B and E, all of which may be located in a single filter room C which is connected through wash room D to return ducting 26 leading back to the card room. The wiring and controls in FIG. 4 are schematic, and these will be designed to conform to particular requirements and to utilize available equipment. An auxiliary fan may be provided in duct 13 between the exhaust from rotary filter E and secondary filter B in order to overcome the added resistance of the rotary filter. The invention may be modified in these and other respects as will occur to those skilled in the art, and the exclusive use of all modifications as come within the scope of the appended claims is contemplated.

I claim:
1. Fly lint collection apparatus for collecting lint from a carding machine comprising a duct, pneumatic suction means connected to said duct for drawing fly lint and carrier air through said duct, a housing including a cylindrical upper portion and a lower portion connected thereto, said lower portion including an inlet and an outlet in an end wall of the upper portion, portions of said duct being respectively connected to said inlet and outlet, a cylindrical screen filter drum rotatably mounted in coaxial relation with said upper portion and substantially coextensive therewith, means for driving said drum, a longitudinal outlet in the cylindrical wall in said upper portion for the removal of lint, doffing rollers rotatably mounted in said outlet in axial adjacent spaced relation to each other and said filter drum, one of said rollers including outwardly projecting flights, rotating opposite to the other roller and the filter drum, a second housing positioned intermediate the suction means and said second housing including a filter for removing any remaining fly lint, said means for driving said drum including an electric drive motor connected in an electrical control circuit, said electrical control circuit including a timer, a relay connected to a switch on said timer, said relay having a switch connected in circuit with an electrical drive motor, and having normally open contacts, whereby said drive motor is periodically energized, a second motor in circuit with said drive motor and connected to said switch on said timer to control the duration of said drive motor energization.

References Cited

UNITED STATES PATENTS

| | | | |
|---|---|---|---|
| 1,697,647 | 1/1929 | Hancock et al. | 55—290 |
| 1,720,702 | 7/1929 | Streun | 55—290 |
| 2,169,435 | 8/1939 | Simpson | 55—272 |
| 2,810,163 | 10/1957 | Kyame et al. | 19—107 |
| 2,979,755 | 4/1961 | McCaskill | 15—352 |
| 3,110,182 | 11/1963 | Moss et al. | 55—400 |
| 3,212,239 | 10/1965 | Maestrelli | 55—429 |
| 3,243,940 | 4/1966 | Larson | 55—96 |

FOREIGN PATENTS

| | | |
|---|---|---|
| 1,397,514 | 3/1965 | France. |
| 565,905 | 12/1944 | Great Britain. |
| 817,030 | 7/1959 | Great Britain. |

FRANK W. LUTTER, Primary Examiner

B. NOZICK, Assistant Examiner

U.S. Cl. X.R.

19—107; 55—290, 350, 400, 429, 482